UNITED STATES PATENT OFFICE.

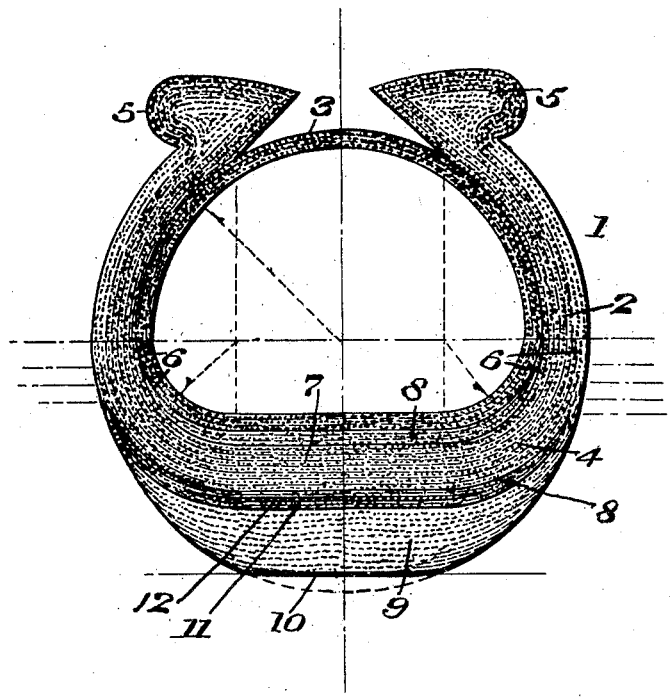

JOSEPH S. WILLIAMS, OF RIVERTON, NEW JERSEY.

RESILIENT TIRE.

1,382,399.    Specification of Letters Patent.    Patented June 21, 1921.

Original application filed January 19, 1911, Serial No. 603,552. Divided and this application filed December 15, 1917. Serial No. 207,233.

*To all whom it may concern:*

Be it known that I, JOSEPH S. WILLIAMS, a citizen of the United States, residing at Riverton, in the county of Burlington, State of New Jersey, have invented a new and useful Resilient Tire, of which the following is a specification.

My present invention is a division of my co-pending application, Serial No. 603,552, filed January 19th, 1911 and patented December 18, 1917, No. 1,250,405.

The object of my invention is to provide a tire which can be applied to the present rim equipments which will be free from the complicated strains to which an ordinary type of circular tire is subjected in service due to the flattening of the arch in transverse section in proportion to the chord line of the annular arch formation of the tire.

It is a further object of this invention to provide the spanning portions of the flattened arch in transverse section with curvatures in the sides of the spans of about ninety degrees outwardly of the major transverse axis of the tire, so that such will provide flexing supports tangential to the annular and transverse spanning portions crossing the planes of the tire between such curvatures.

It is a further object of this invention to employ, position and combine flexible tension with vulcanized rubber annularly and transversely in the flattened arch formation to secure the requisite standards of stability to restrain undue circumferential and lateral elongation and deformation of the flattened arch and the portions of the tire inwardly of the major axis when the tire is on wheel equipment and subjected to pressure from within by any suitable means to provide load supporting capacities therein.

Other objects and advantages of my invention will hereinafter appear in the detailed description.

For the purpose of illustrating my invention, I have shown in the accompanying drawings a typical embodiment of it which is at present preferred by me, since this embodiment will give in practice satisfactory and reliable results, although it is to be understood that the various instrumentalities of which my invention consists can be variously arranged and organized and that my invention is not limited to the precise arrangement and organization of these instrumentalities as herein shown and described.

In the drawing, I have shown, in transverse section, a tire embodying my invention.

Referring to the drawing:

1 designates a tire embodying my invention and consisting of an outer shoe or casing 2 and a fluid tight tube 3. The shoe 2 consists of multiple layers 4 of rubber and tensile material, for example, fabric, vulcanized together and disposed in a novel manner. Inwardly of the major axis of the tire in cross section, the shoe is disposed in arch formation from the major axis to the beads 5. Outwardly of the major axis the shoe is disposed in flattened arch formation. The curvature 6 at the sides outwardly of the major axis are, as shown, at substantially ninety degrees and the connecting portion 7 between such curvatures is disposed substantially parallel with the major axis. The shoe is also provided with one or more layers 8 of tension portions extending circumferentially and preferably concentric with the layers 4.

The layers 8 are formed of any desired number of layers of vulcanized rubber and tensile material. 9 designates the tread, the contact surface of which lies within a circle formed by a radius of one-half the major axis of the tire in cross section. The contact surface of the tread is preferably flattened, as indicated at 10. If desired, an annular flexible reinforcement 11 of a material of a high standard of tensility, such as nickel, carbon or vanadium steel may be disposed in the shoe substantially parallel with the major axis. This does not prevent the flexing of the shoe and serves to resist internal pressure from within the tire and to resist puncture of the tire from without. This member 11 is preferably incased in and combined with tough or soft rubber 12 of a high standard of tensility which is combined with fabric. The inner tube 3 is formed of fabric and rubber vulcanized together with the fabric extending annularly and transversely and conforming in contour to the inner periphery of the shoe. The tube is provided with any desired or conventional type of valve mechanism (not shown) for introducing into the tube fluid under pressure or any other desired type of mobile material or filling.

It will be seen that inwardly of the major axis in cross section, the tire conforms in contour to an ordinary tube while outwardly of such major axis it is in flattened arch formation with tensile material to restrict circumferential elongation and with tensile material in flattened formation throughout the width of the tread contacting surface which tends to restrict lateral elongation of the tire at such portion. The beads 5 are shown as of the conventional clencher type but any other form of terminals may be employed to coact with the type of rim mechanism with which the tire is to be used.

The tensile material which provides the lateral tension extends around the sides to the beads or terminals and provides the requisite tensile strength to resist internal pressure and maintain the flattened arch formation and proper coaction with the terminals and inner seating portions.

My present invention has many advantages over the ordinary circular type of tire. The flattened arch formation eliminates the local action which takes place under load compression in the ordinary pneumatic type of tire, and gives a larger area of resilient support for the inner portion of the tread.

It also provides for using a much greater depth of tread than is practicable in the ordinary circular tire and maintaining the tread surface mainly or entirely within a circle formed by a radius of one-half the diameter of the tire.

It will now be apparent that I have devised a novel and useful resilient tire which embodies the features of advantage enumerated as desirable in the statement of the invention and the above description, and while I have, in the present instance, shown and described a typical embodiment of it which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. A tire having a tension belt in circular formation inwardly of the major transverse axis of the tire in cross section and in flattened arch formation outwardly of said axis, said tension belt having combined in its flattened arch formation annular reinforcements of tensile material to limit under working conditions of internal pressure and load within definite ranges the inward and outward movements of the flattened arch formation and the lateral movements of the side walls of the tension belt, and a tread outwardly of said tension belt.

2. A tire having a tension belt in circular formation inwardly of the major transverse axis of the tire in cross section and in flattened arch formation outwardly of such axis and in proximity to it, said tension belt having combined in its flattened arch formation annularly and transversely disposed reinforcements of flexible tensile material contributing under operative conditions of load and internal pressure to restrain circumferential and transverse elongation of such flattened arch formation, a tread outwardly of the tension belt and means within said belt to maintain it in tension when under load.

3. A tire having a tension belt in circular formation inwardly of the major transverse axis of the tire in cross section and in flattened arch formation outwardly of such axis and in proximity to it, said tension belt having combined in its flattened arch formation an annularly and transversely disposed metal member contributing under operative conditions of load and internal pressure to restrain circumferential and transverse elongation of such flattened arch formation, a tread outwardly of the tension belt, and means within said belt to maintain it in tension when under load.

4. A tire having a tension belt in circular formation inwardly of the major transverse axis of the tire and in flattened arch formation outwardly of said axis, with flexible tension material transversely disposed in the flattened arch formation, in combination with flexible tensile material extending as an annular reinforcement in vulcanized combination with said flattened arch formation, and a tread encircling the flattened arch formation.

JOSEPH S. WILLIAMS.

Witnesses:
C. D. McVay,
M. E. Byrne.